(No Model.)
O. ZOBEL.
FRICTION GEAR.
No. 387,198. Patented July 31, 1888.
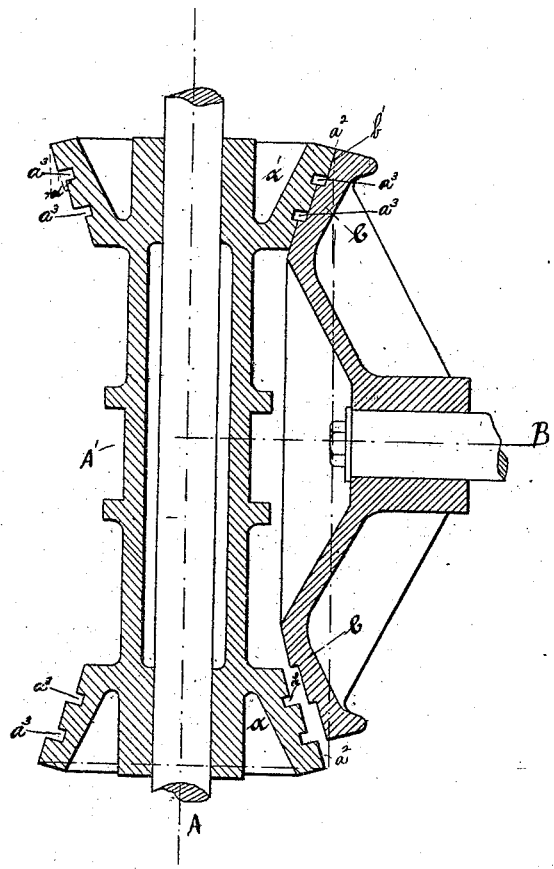
Witnesses:
Paul Fischer,
Carl Gregor.
Inventor.
Otto Zobel.
by
Att'ies

UNITED STATES PATENT OFFICE.

OTTO ZOBEL, OF SCHMALKALDEN, GERMANY.

FRICTION-GEAR.

SPECIFICATION forming part of Letters Patent No. 387,198, dated July 31, 1888.

Application filed January 10, 1888. Serial No. 260,368. (No model.) Patented in Germany April 2, 1887, No. 41,172.

*To all whom it may concern:*

Be it known that I, OTTO ZOBEL, of Schmalkalden, in the Kingdom of Prussia and German Empire, have invented a new and useful Friction-Gear, of which the following is a specification, reference being had therein to the accompanying drawings, no patents being obtained by me anywhere for this invention save in Germany, No. 41,172, dated April 2, 1887.

This invention relates to conical friction-wheels for transmitting and reversing motion; and it consists in such wheels, provided with steps on their surfaces for engaging with each other, as hereinafter set forth.

The accompanying drawing shows, in longitudinal section, two of such conical wheels on a sleeve for reversing motion; also, a larger wheel of similar construction for engaging with one or the other of them at will, the contiguous parts of the shafts appearing in elevation.

A designates a shaft having thereon a longitudinally-movable sleeve, A', provided at its ends with reversely-facing conical friction-wheels $a$ $a'$. B designates another shaft approximately at right angles to A, and provided with a conical friction-wheel, $b$, which is large enough to nearly fill the space between the pulleys $a$ and $a'$, so that a very slight endwise motion of sleeve A' on shaft A will suffice to put wheel $a$ into gear with wheel $b$, and wheel $a'$ out of gear therewith, or, vice versa, in either case reversing the direction of the rotary motion transmitted from shaft A to shaft B. I provide the faces of wheels $a$ $a'$ with concentric steps $a^2$, which pass around said wheels, and the outer faces of which are arranged at a different inclination from that of the general face of said wheels. Wheel $b$ is provided likewise with steps $b'$, corresponding in number, arrangement, and inclination of face to the steps $a^2$. The frictional contact between wheel $b$ and wheel $a$ or $a'$ is wholly between the inclined faces of the steps. As the angle of said faces with shaft A is less than the angle of the general face of the wheels $a$ $a'$ therewith, the wedge-action of said wheels on wheel $b$ will be greater, and their frictional contact greater, also.

Between the successive annular steps $a^2$ of pulleys $a$ $a'$, I make annular grooves $a^3$. Each step $b'$ has a broader face than the corresponding face of the step $a^2$, with which it comes in contact. The first step, $b'$, thus reaches to the shoulder formed by the next step, $b'$, and the second step to the shoulder formed by the third. When the two wheels are in contact, as shown in the drawing, spaces are formed between the wheels, alternating with the parts which are in contact. These spaces consist partly of the grooves $a^3$, and partly of the angular spaces at the points where the faces $b'$ meet the shoulders, as above described. Air will circulate through said spaces, tending to keep the wheels cool. This construction also withdraws a considerable surface from friction.

Having thus described my invention, what I claim as new, and desire to secure by Letters Patent, is—

1. A friction-wheel having a series of annular steps formed on its periphery with alternating annular grooves $a^3$, in combination with another friction-wheel provided with annular steps, which do not enter said grooves, but leave them open, substantially as set forth.

2. A friction-wheel having successive steps $a^2$ formed on its surface, with alternating grooves $a^3$, in combination with another friction-wheel arranged to engage therewith and having broader steps, $b'$, these two wheels forming spaces alternating with the parts which are in contact, as described.

3. A sleeve with a friction-wheel on each end, each wheel being formed with a series of annular steps, $a^2$, and alternating grooves $a^3$, the said steps having faces of less inclination than the general surfaces of the friction-wheels, in combination with a wheel, $b$, arranged to be put into frictional contact with either one of said wheels $a$ or $a'$, at will, and having steps which are broader than the corresponding steps of the latter, whereby said wheels $b$ and $a$ or $a'$ leave annular spaces between them, alternating with the parts in contact, substantially as set forth.

In witness whereof I have hereunto set my hand in presence of two witnesses.

OTTO ZOBEL.

Witnesses:
HERMAN JUNKER,
MARIE STEHMANN.